US008818096B2

(12) United States Patent
Tojo

(10) Patent No.: US 8,818,096 B2
(45) Date of Patent: Aug. 26, 2014

(54) APPARATUS AND METHOD FOR DETECTING SUBJECT FROM IMAGE

(75) Inventor: Hiroshi Tojo, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 326 days.

(21) Appl. No.: 13/212,619

(22) Filed: Aug. 18, 2011

(65) Prior Publication Data

US 2012/0051593 A1   Mar. 1, 2012

(30) Foreign Application Priority Data

Aug. 26, 2010  (JP) .................................. 2010-189741

(51) Int. Cl.
G06K 9/34  (2006.01)
(52) U.S. Cl.
USPC ......................................... 382/173; 382/282
(58) Field of Classification Search
USPC ........... 382/103, 107, 173, 282; 358/453, 464
See application file for complete search history.

(56) References Cited

U.S. PATENT DOCUMENTS

| 2004/0151342 | A1* | 8/2004 | Venetianer et al. ........... 382/103 |
| 2008/0240500 | A1* | 10/2008 | Huang et al. ................... 382/103 |
| 2009/0087086 | A1* | 4/2009 | Eaton et al. .................... 382/164 |
| 2011/0254950 | A1* | 10/2011 | Bibby et al. ................... 348/135 |

FOREIGN PATENT DOCUMENTS

| JP | 2001-268657 A | 9/2001 | |
| JP | 2002-74371 A | 3/2002 | ................ G06T 7/20 |
| JP | 2010-003177 A | 1/2010 | |

OTHER PUBLICATIONS

Machine translation of JP 2010-003177 A (printed Jul. 18, 2014).*

* cited by examiner

*Primary Examiner* — Andrew W Johns
(74) *Attorney, Agent, or Firm* — Canon USA, Inc. IP Division

(57) ABSTRACT

An image processing apparatus includes a calculation unit configured to calculate a difference between a feature quantity of input video data and a feature quantity of a model representing a background, a determination unit configured to determine whether a partial area in the input video data is a foreground or a background based on the difference, a detection unit configured to detect a subject area from an area determined to be a foreground, a first update unit configured to update appearance information that represents an appearance state of a background relating to the subject area, and a second update unit configured to update the model based on the appearance information.

10 Claims, 16 Drawing Sheets

FIG. 5

| NUMBER OF SUBJECTS |
| --- |
| UPPER LEFT COORDINATES 1 |
| LOWER RIGHT COORDINATES 1 |
| UPPER LEFT COORDINATES 2 |
| LOWER RIGHT COORDINATES 2 |
| ⋮ |

FIG. 7

| STANDARD MODEL MANAGEMENT INFORMATION | POSITION | POINTER | | | |
|---|---|---|---|---|---|
| | (X1, Y1) | 1200 | | | |
| | (X2, Y1) | 1202 | | | |
| | ... | ... | | | |

| STANDARD MODEL INFORMATION FOR EACH POSITION | STATE NUMBER | FEATURE QUANTITY | GENERATION TIME | NUMBER OF APPEARANCES | ACTIVE FLAG |
|---|---|---|---|---|---|
| ADDRESS 1200 | 1 | 100 | 0 | 300 | ON |
| ADDRESS 1201 | 2 | 230 | 101 | 35 | OFF |
| ADDRESS 1202 | 1 | 10 | 0 | 315 | OFF |
| ADDRESS 1203 | 2 | 200 | 180 | 20 | ON |
| ... | ... | ... | ... | ... | ... |

FIG. 8

| POSITION | STATE NUMBER | MINIMUM DIFFERENCE VALUE |
|---|---|---|
| (X1, Y1) | 1 | 30 |
| (X2, Y1) | 2 | 120 |
| : | : | : |

FIG. 10

| POSITION | NUMBER OF APPEARANCES |
|---|---|
| (X1, Y1) | 300 |
| (X2, Y1) | 20 |
| : | : |

FIG. 12

| POSITION | NUMBER OF APPEARANCES | FOREGROUND FLAG |
|---|---|---|
| (X1, Y1) | 300 | OFF |
| (X2, Y1) | 20 | ON |
| : | : | : |

FIG. 13

| NUMBER OF FOREGROUND AREAS |
|---|
| UPPER LEFT COORDINATES 1 |
| LOWER RIGHT COORDINATES 1 |
| UPPER LEFT COORDINATES 2 |
| LOWER RIGHT COORDINATES 2 |
| ⋮ |

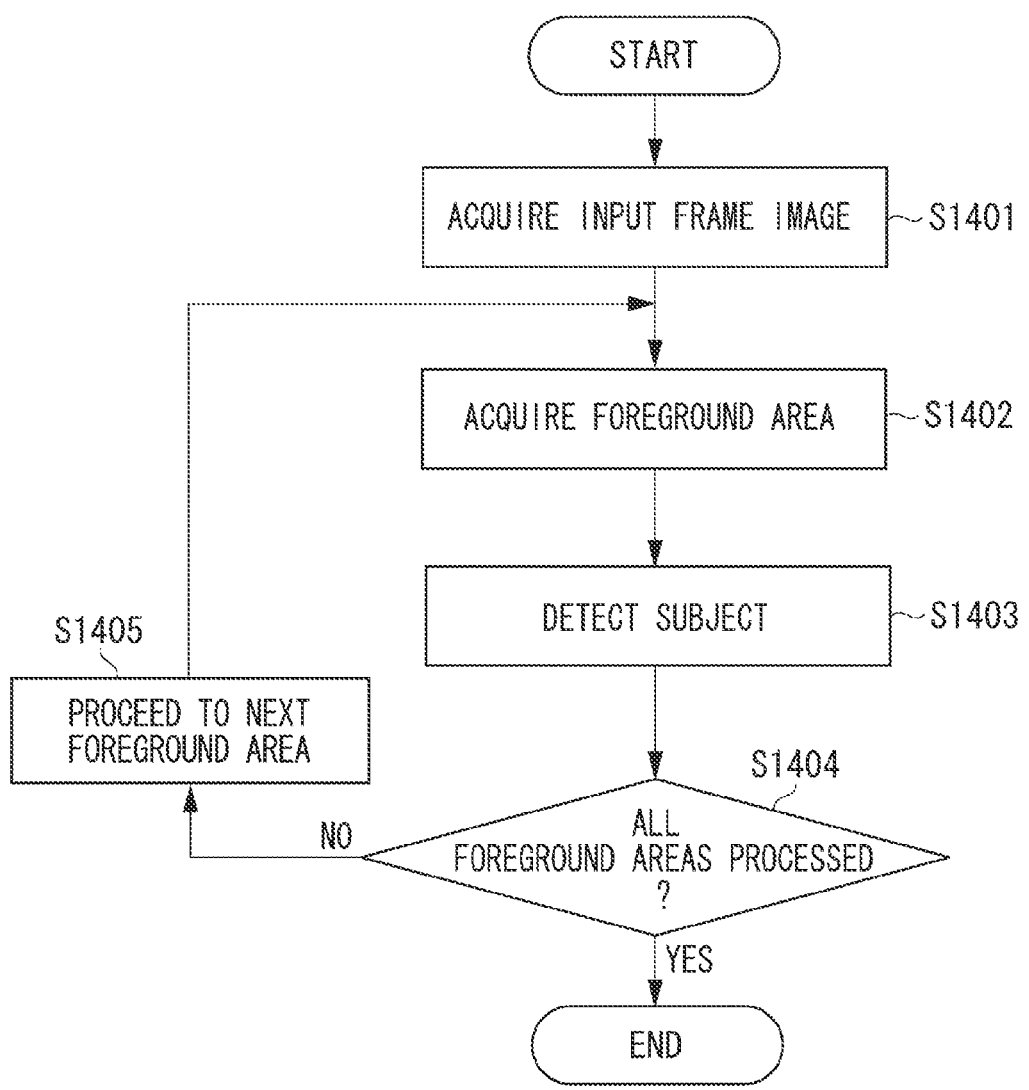

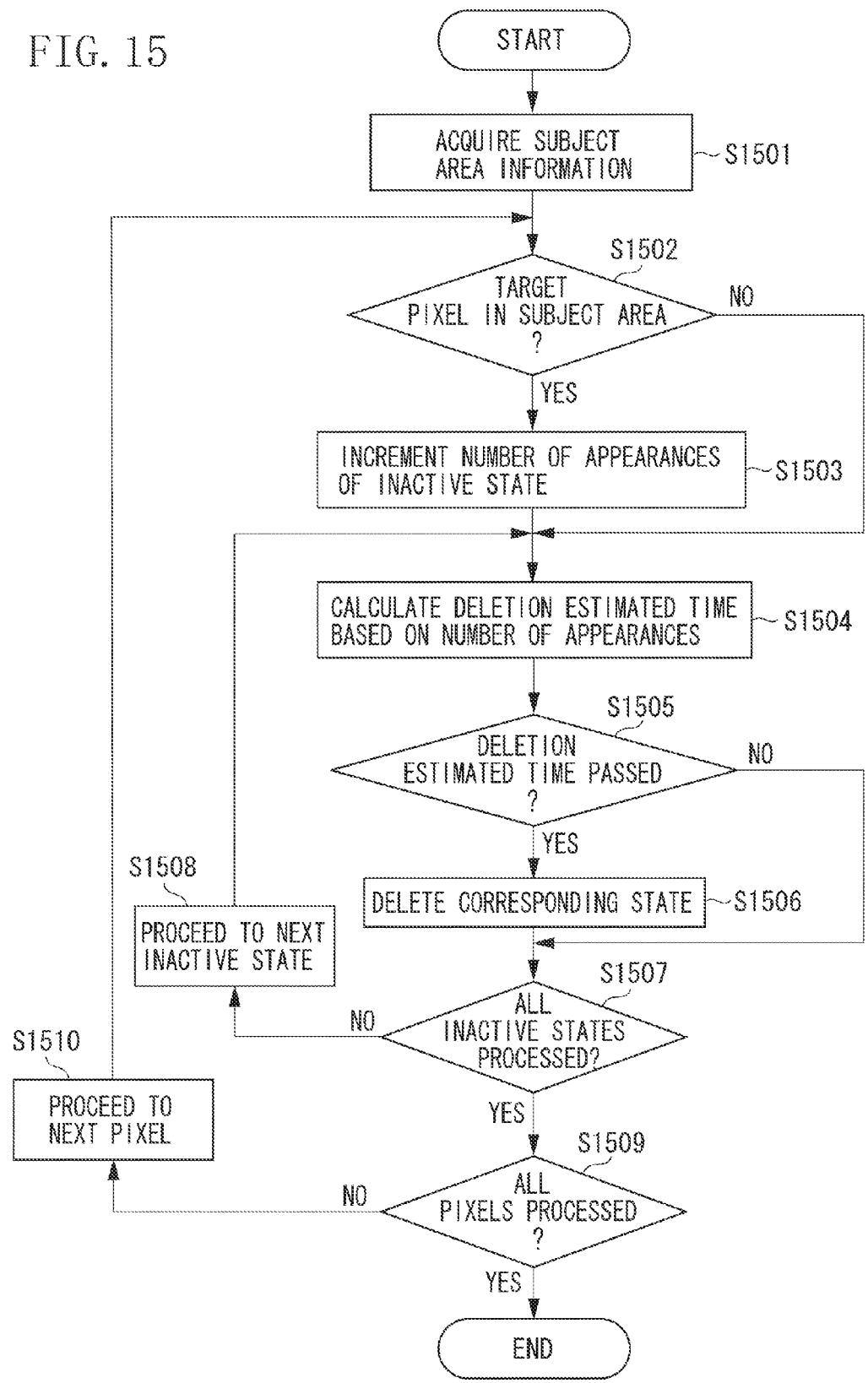

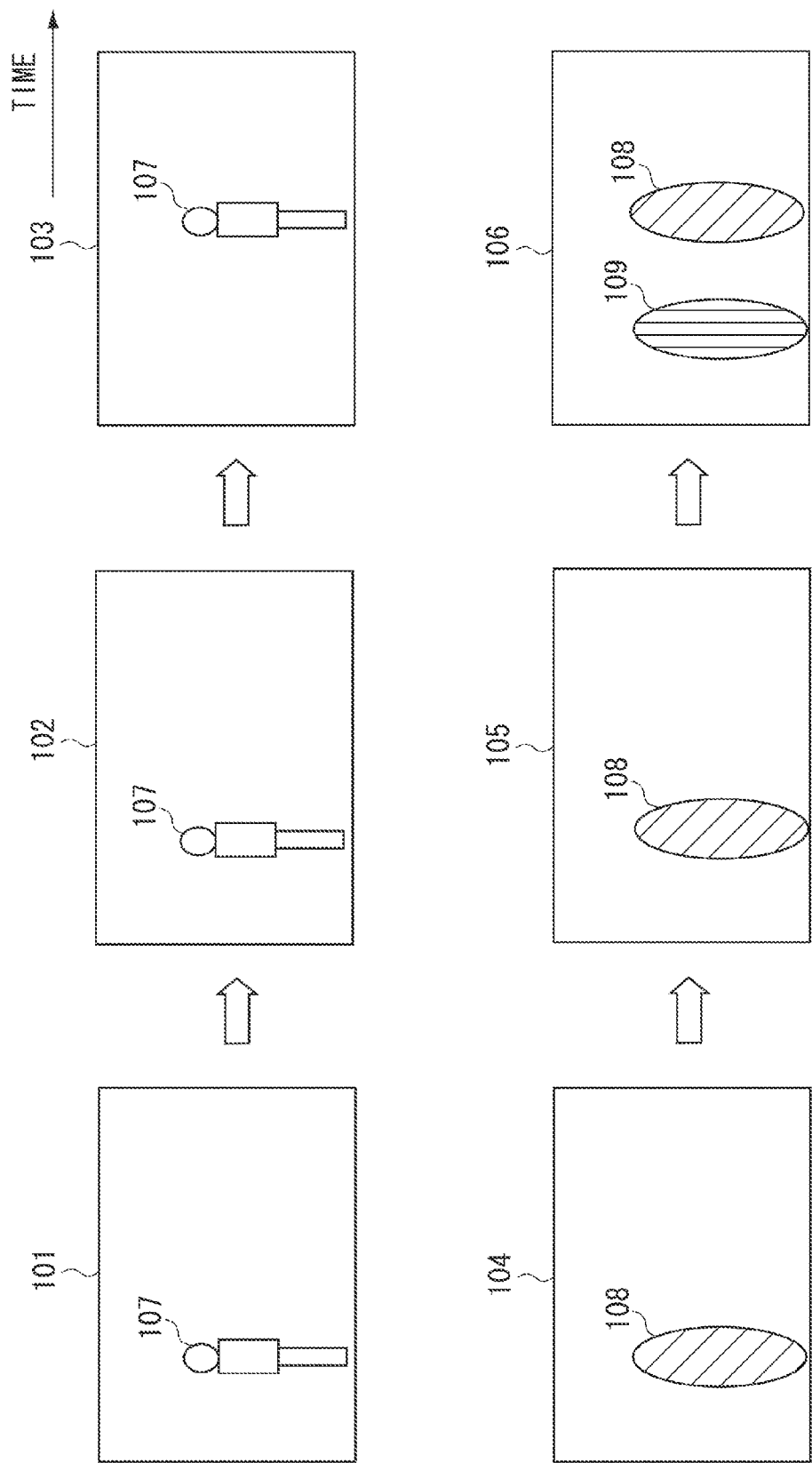

APPARATUS AND METHOD FOR DETECTING SUBJECT FROM IMAGE

BACKGROUND OF THE INVENTION

1. Field of the Invention

The present invention relates to an apparatus and a method for detecting a subject from an image. More particularly, the present invention relates to a technique suitable for detecting a moving object, for example.

2. Description of the Related Art

An example of a technique to detect an object in an image captured by a camera is to detect a moving object based on a background difference method. In the background difference method, a background image that does not contain a subject is captured in advance with a fixed camera, and a feature quantity of the captured image is stored as a standard model. Then, a difference between the feature quantity in an image input from the camera and the feature quantity in the standard model is calculated. Areas in the input image that have a large difference are detected as a foreground (moving object).

Further, in the background difference method, to respond to changes in the background, processing is performed that deletes (forgets) from the standard model features that have not appeared for some time. Consequently, detection of the foreground area can be performed accurately.

Another technique is to detect a specific subject, such as a face or a person, from the image. In this method, a detection window having a predetermined size is scanned in an input image. A pattern image is cut out from the image in the detection window, and this pattern image is subjected to a two-class determination regarding whether it is a subject or not.

In this determination, a determination device is configured by using adaptive boosting to effectively combine many weak determination devices in order to improve the determination accuracy. Further, these determination devices are connected in series to form a cascade-type detection device. The weak determination devices are configured based on a Haar-type rectangular feature quantity.

The cascade-type detection device deletes pattern candidates that are clearly not subjects by using a simple preliminary-stage detection device. Determination is then performed on only the remaining candidates regarding whether they are subjects by using a complex advanced-stage determination device that has a superior identification performance.

For example, Japanese Patent Application Laid-Open No. 2002-74371 discusses a technique in which subject (person) identification is performed only on areas determined to be a moving object area obtained based on a background difference. Generally, since subject detection is performed by scanning a detection window in an image, and then each time using a plurality of determination devices, the processing costs become very expensive. Therefore, by performing subject detection only on the moving object areas that are detected based on a background difference as described above, the overall processing costs can be reduced as compared with performing such processing on all areas in the image.

However, in a place such as a waiting room, for example, when detecting a person as the subject, the person will often move around after stopping for a predetermined time. FIG. 16 illustrates frame images 101 to 103 showing such a case, and detection results 104 to 106 for the conventional background difference obtained at this time. Further, an area 107 is a person area, and areas 108 and 109 are detected as a foreground. Time flows from left to right.

In FIG. 16, while the person 107 is stopped (frame images 101 and 102), if a predetermined time elapses, the feature quantity of the background hidden by the person 107 is forgotten from the standard model. When the I/O device 107 moves, not only the area 108 corresponding to the person, but the background that has reappeared is also detected as a new foreground area 109 because a difference occurs when compared with the standard model.

Each time this situation occurs like in the technique discussed in Japanese Patent Application Laid-Open No. 2002-74371, if such a event has occurred, the foreground areas becomes wide even if the subject detection and search range is narrowed based on a background difference. More specifically, the subject detection search range cannot be appropriately narrowed, which makes it impossible to perform rapid subject detection.

SUMMARY OF THE INVENTION

The present invention is directed to an image processing apparatus that can stably and rapidly detect a subject.

According to an aspect of the present invention, an image processing apparatus includes a calculation unit configured to calculate a difference between a feature quantity for input video data and a feature quantity for a model representing a background, a determination unit configured to determine whether a partial area in the input video data is foreground or background based on the difference, a detection unit configured to detect a subject area from the areas determined to be a foreground, a first update unit configured to update appearance information that represents an appearance state for a background relating to the subject area, and a second update unit configured to update the model based on the appearance information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates an example of subject area information.

FIG. 7 illustrates an example of a standard model configuration in detail.

FIG. 8 illustrates an example of minimum difference value information.

FIG. 10 illustrates an example of active flag information.

FIG. 12 illustrates an example of active flag information to which a foreground flag is added.

FIG. 13 illustrates an example of foreground area information.

FIG. 14 is a flowchart illustrating an example of the detailed procedures performed in subject detection processing.

FIG. 15 is a flowchart illustrating an example of the detailed procedures performed in second and third update processing of the standard model.

FIG. 16 illustrates frame images and the conventional background difference detection results obtained at this time.

DESCRIPTION OF THE EMBODIMENTS

Various exemplary embodiments, features, and aspects of the invention will be described in detail below with reference to the drawings.

Figure 2:
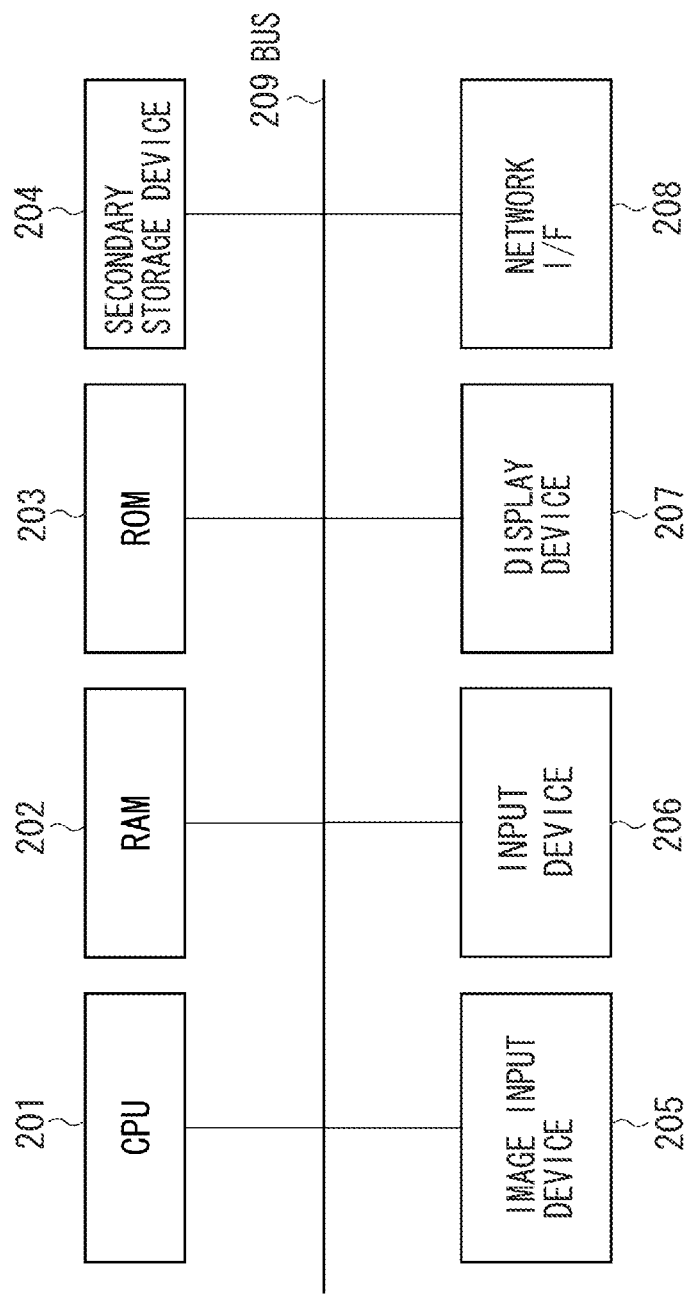
FIG. 2 is a block diagram illustrating a hardware configuration example of an image processing apparatus.

FIG. 2 is a block diagram illustrating a hardware configuration example of an image processing apparatus according to a first exemplary embodiment.

In FIG. 2, a central processing unit (CPU) 201 executes commands based on programs stored in a read-only memory (ROM) 202 and a random access memory (RAM) 203. The ROM 202 is a nonvolatile memory that stores these programs as well as other programs and data necessary for control. The RAM 203 is a volatile memory that stores temporary data, such as frame image data and pattern determination results.

A secondary storage device 204 is a rewritable storage device such as a hard disk drive or a flash memory. The secondary storage device 204 stores, for example, image information, an image processing program, and various setting contents in a nonvolatile manner. Such information is transferred to the RAM 203 so that the CPU 201 can utilize the programs and data.

An image input device 205 is, for example, a digital video camera, a network camera, or an infrared camera, used for inputting image data. An input device 206 is, for example, a keyboard or a mouse that allows inputs from the user.

A display device 207 is, for example, a cathode-ray tube (CRT) or a liquid crystal display, which displays processing results to the user. A network interface (I/F) 208 is, for example, a modem or a local area network (LAN) card used to connect the image processing apparatus to a network such as the Internet or an intranet.

A bus 209 is connected to each of the above units to allow data to be exchanged between them. The image processing apparatus according to the present exemplary embodiment is mounted as an application operating on an operating system.

Figure 1:
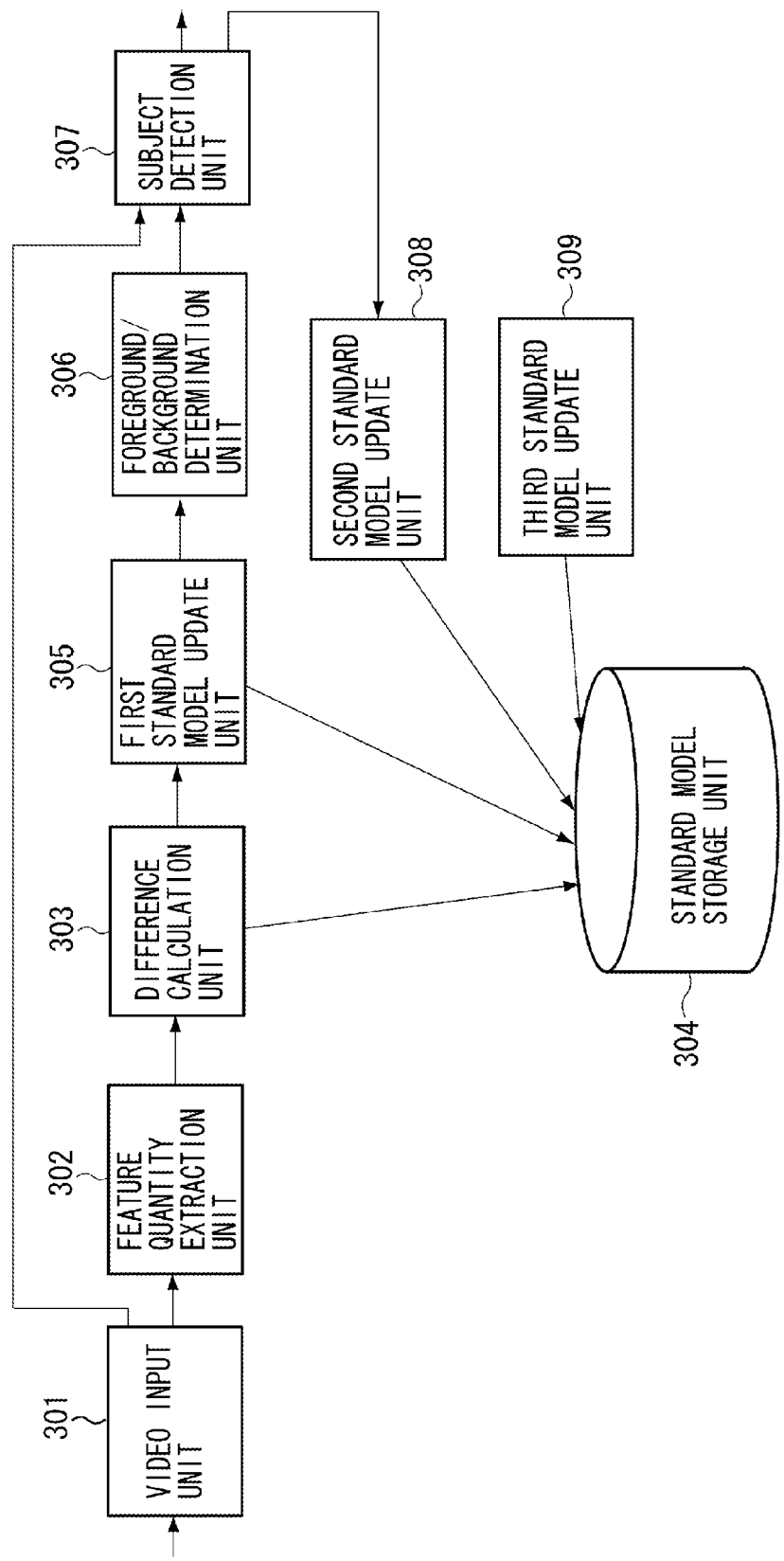
FIG. 1 is a block diagram illustrating a function configuration example of an image processing apparatus.

FIG. 1 is a block diagram illustrating a function configuration example of the image processing apparatus according to the present exemplary embodiment. A video input unit 301 is configured from the image input device 205, and inputs video data (image data). A feature quantity extraction unit 302 extracts a feature quantity from the video.

A difference calculation unit 303 calculates a difference between a standard model read from a (below-described) standard model storage unit 304 and the input video. The standard model storage unit 304 is configured from the RAM 203 and the secondary storage device 204, and stores the state of each position in the video as a standard model represented by an image feature quantity. This standard model will be described in more detail below. A first standard model update unit 305 updates the standard model stored in the standard model storage unit 304 based on a calculation result from the difference calculation unit 303.

A foreground/background determination unit 306 determines whether each position in the input video image is a foreground or a background based on the standard model updated by the first standard model update unit 305. A subject detection unit 307 detects the area of a specific subject (in the present exemplary embodiment, a person) from the areas determined to be a foreground by the foreground/background determination unit 306.

A second standard model update unit 308 updates the standard model stored in the standard model storage unit 304 based on a detection result from the subject detection unit 307. A third standard model update unit 309 deletes the states that have not appeared for a predetermined time or more in the standard model.

Figure 4:
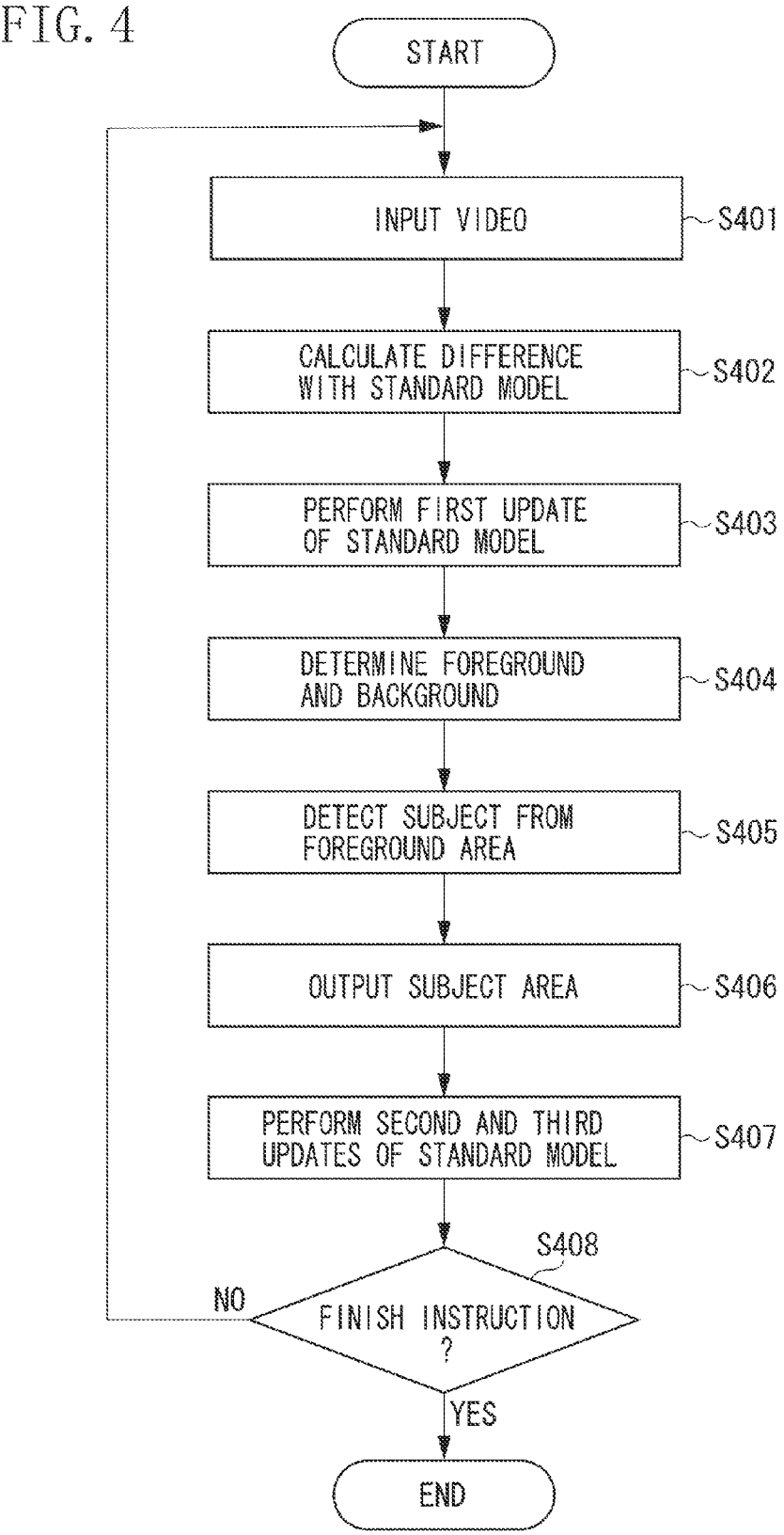
FIG. 4 is a flowchart illustrating an example of an image processing apparatus processing procedure.

Next, the general flow of the processing performed in the present exemplary embodiment will be described referring to FIG. 4. FIG. 4 is a flowchart illustrating an example of the processing procedure performed by the image processing apparatus according to the present exemplary embodiment.

First, in step S401, the video input unit 301 inputs a video image, such as a captured image, and obtains a frame image for each predetermined time. Next, in step S402, the feature quantity extraction unit 302 extracts the feature quantity from a frame image. Then, the difference calculation unit 303 reads a past feature quantity in the standard model from the standard model storage unit 304, and calculates the difference between the read feature quantity and the feature quantity in the frame image. The processing performed in step S402 will be described in more detail below.

Next, in step S403, the first standard model update unit 305 determines the standard model of a state near the frame image based on the difference calculated by the difference calculation unit 303, and updates the standard model in the standard model storage unit 304. The processing performed in step S403 will be described in more detail below.

Next, in step S404, the foreground/background determination unit 306 divides the areas in the video image into foreground areas and background areas. The processing performed in step S404 will be described in more detail below.

Next, in step S405, the subject detection unit 307 detects a subject from the foreground areas determined by the foreground/background determination unit 306. The processing performed in step S406 will be described in more detail below. Then, in step S406, the subject detection unit 307 outputs subject area information indicating the detected subject areas.

FIG. 5 illustrates an example of subject area information. This example is configured from the number of subject areas and the coordinates of the corners of a circumscribed rectangle defining each subject. The output subject area information is used for displaying subject areas as a rectangle in the video input by the display device 207.

Next, in step S407, the second standard model update unit 308 and the third standard model update unit 309 respectively update the standard model based on the detection results output from the subject detection unit 307 and the number of appearances in the standard model (appearance time information).

The processing performed in step S407 will be described in more detail below. Next, in step S408, the image processing apparatus determines whether there has been a finish instruction from the user, such as the power being turned off, for example. If there has been no finish instruction (NO in step S408), the image processing apparatus repeats the processing of steps S401 to 407.

Figure 6:
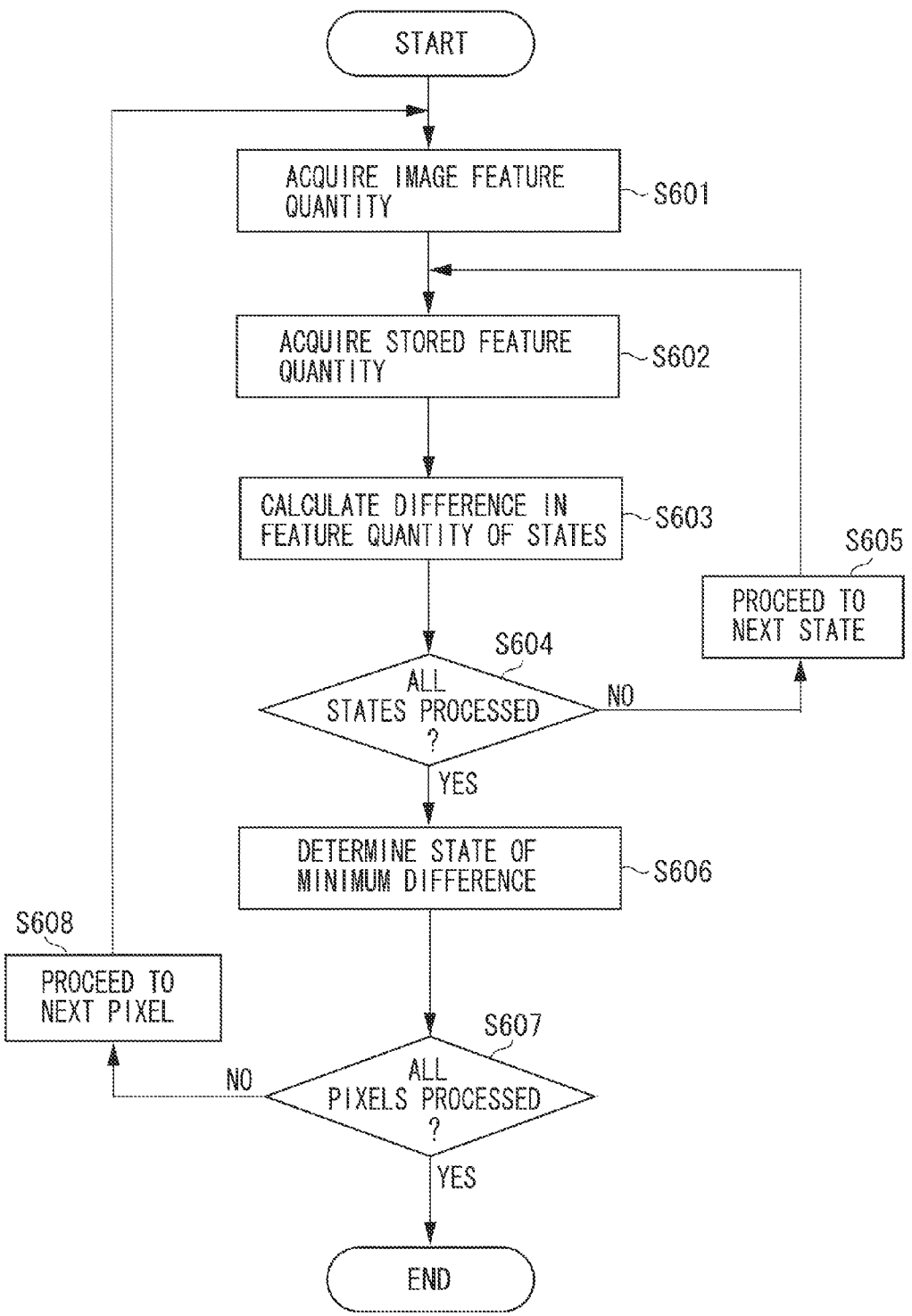
FIG. 6 is a flowchart illustrating an example of the detailed procedures performed in difference calculation processing.

FIG. 6 is a flowchart illustrating an example of the detailed procedures performed in the difference calculation processing of step S402 in FIG. 4.

First, in step S601, the difference calculation unit 303 acquires from the frame image an image feature quantity as a value that represents the state of each position. Examples of the image feature quantity include, but are not especially limited to, luminance, color, and edge.

Further, the feature quantity may be for each pixel or for each partial area. Examples of the feature quantity for each partial area include the average luminance and a discreet cosine transform (DCT) coefficient of the pixels in an 8×8 pixel block.

If the frame image has been compressed and encoded in a joint photographic experts group (JPEG) format, since a DCT coefficient has been already obtained when the image has been compressed, this is the same as a feature quantity being extracted. Therefore, in this case, the DCT coefficient may be directly extracted from the JPEG-format frame image and used as the feature quantity.

In the present exemplary embodiment, the feature quantity is the luminance of each pixel. Further, the processing described below starts from the pixel at the upper left of the frame image, then proceeds from left to right moving down along each line.

Next, in step S602, the difference calculation unit 303 acquires the feature quantity of the pixels at a target position from the standard model stored in the standard model storage unit 304. The standard model stored in the standard model storage unit 304 will be described referring to FIG. 7. The standard model represents the state of each position in the frame image in terms of an image feature quantity. The standard model is configured from two portions, standard model management information and standard model information for each position.

The standard model management information is configured from position information and a pointer at each position to the standard model information for each position. The position information may be a value that indicates the position of the pixels in the frame image based on XY coordinates, or may be a number assigned from left to right for each line in descending order in 8×8 pixels. In the present exemplary embodiment, the position information is a value that indicates the position of the pixels in the frame image based on XY coordinates.

The standard model information for each position stores a plurality of states corresponding to each position. This is in order to respond to the background which changes over time due to changes in the illumination and the appearance of new immobile objects (e.g., a flower vase). Each state stores a state number, an image feature quantity representing the state, a generation time, a number of appearances, and an active flag.

The generation time is the time that the state was first generated in the standard model. This generation time may be represented as the time itself or as a frame number. The number of appearances is the number of times that a similar state has appeared in the input video image. The active flag is a flag indicating that this state is similar to a state that has appeared in the current frame image.

The plurality of states at the same position in the frame image are consecutively stored in the destination referred to by the standard model management information pointer. In the example illustrated in FIG. 7, a state with a state number 1 is stored in an address 1200 for position (X1,Y1), and a state with a state number 2 is stored in an address 1201. Therefore, to read all of the states corresponding to the target position, it is sufficient to refer to the target position and the pointer for the next position based on the standard model management information and read from the address of the target position up to the address one before the next position.

Thus, in step S602, the difference calculation unit 303 acquires the feature quantity of one state by referring to the pointer to the standard model information for each position in the target position from the standard model management information. If this is the first position, the difference calculation unit 303 acquires the feature quantity for state number 1 (in the example illustrated in FIG. 7, "100").

Next, in step S603, the difference calculation unit 303 calculates the difference between the feature quantity acquired from the standard model storage unit 304 and the feature quantity for the same position in the frame image. In the present exemplary embodiment, although the absolute value of the difference between these two feature quantities is used as this difference, the present invention is not especially limited to this. For example, the value may be obtained by squaring the difference. The difference value is associated with the position in the frame image, and temporarily stored in the RAM 203.

Next, in step S604, the difference calculation unit 303 determines whether there are any states at the target position for which a difference has not been calculated. This calculation is performed by reading up to the address written in the pointer for the next target position in the standard model management information. If it is determined that there is a state for which a difference has not been calculated (YES in step S604), in step S605, the difference calculation unit 303 increments the address from which the standard model information for each position is read, and reads the next state. Then, the processing from steps S602 to S604 is repeated.

On the other hand, if it is determined that there are no states for which a difference has not been calculated (NO in step S604), in step S606, the difference calculation unit 303 determines the minimum value among the difference values between the frame image and all of the states in the standard model. The state number and the position in the frame image corresponding to this minimum difference value are associated with the minimum difference value, and temporarily stored in the RAM 203 as minimum difference value information. An example of minimum difference value information is illustrated in FIG. 8.

Next, in step S607, the difference calculation unit 303 determines whether all pixels (positions) in the frame image have been processed. If it is determined that not all pixels have been processed (NO in step S607), in step S608, the processing proceeds to the next pixel, and the processing of steps S601 to S606 is repeated.

On the other hand, if it is determined that all pixels have been processed (YES in step S607), the processing is finished. Since the standard model is not yet stored at the start time of the image processing, for example, the maximum value is set as the calculated difference value. As described below, these are all determined to be new states.

Figure 9:
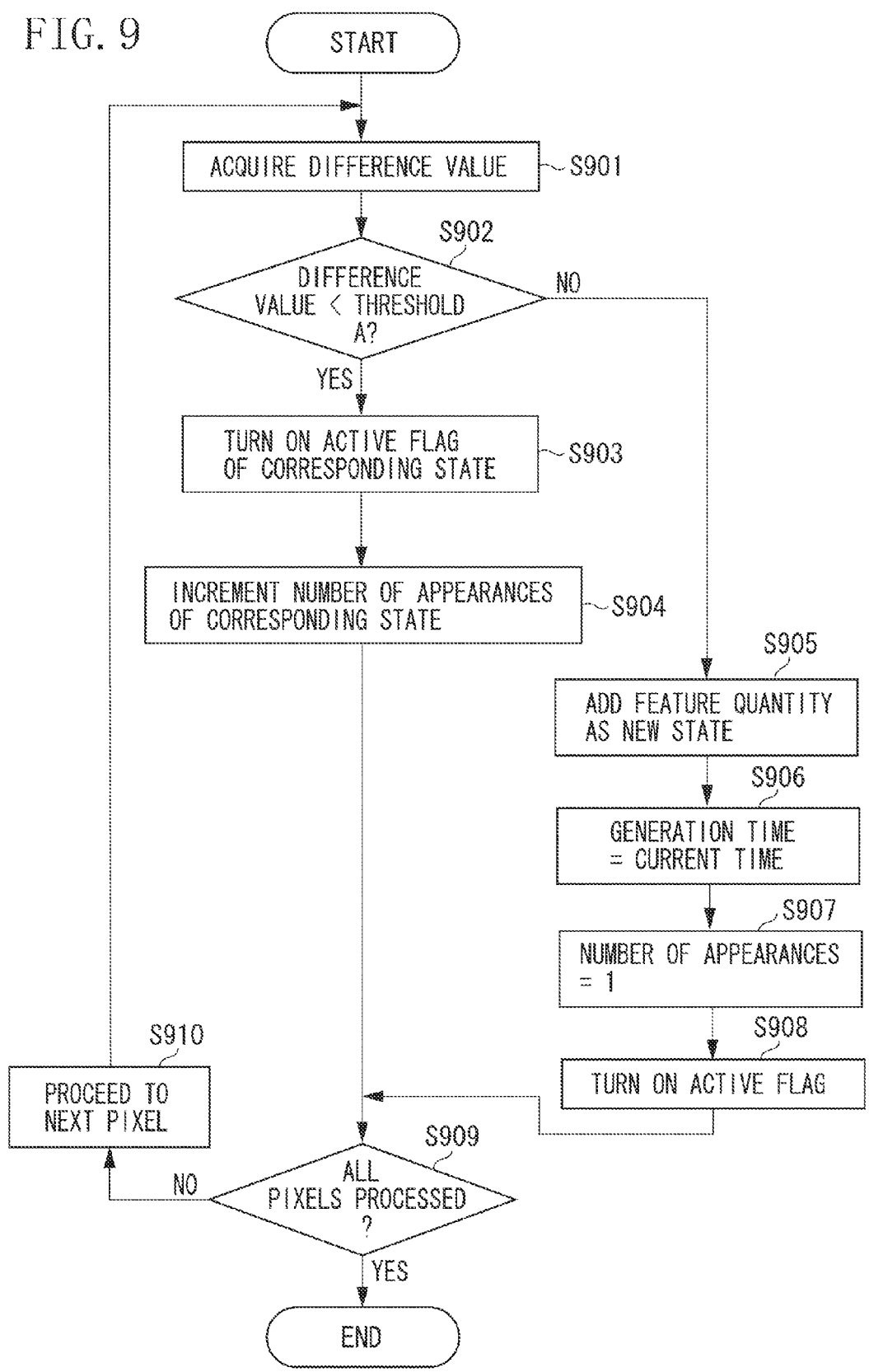
FIG. 9 is a flowchart illustrating an example of the detailed procedures performed in first update processing of the standard model.

FIG. 9 is a flowchart illustrating an example of the detailed procedures performed in the first update processing of the standard model in step S403.

First, in step S901, the first standard model update unit 305 acquires a minimum difference value obtained by the difference calculation processing in step S402 from the minimum difference value information that is temporarily stored in the RAM 203. The minimum difference values are acquired one at a time starting from the pixel at the upper left of the frame image, then proceeding from left to right moving down along each line.

Next, in step S902, the first standard model update unit 305 compares the minimum difference value at a target position with a threshold A. If the difference value is less than the threshold A (YES in step S902), the first standard model update unit 305 determines that this minimum difference value is similar to a state stored in the standard model, and thus the processing proceeds to step S903. On the other hand, if the difference value is equal to or greater than the threshold A (NO in step S902), the first standard model update unit 305 determines that this minimum difference value is a new state that is different from all the other states stored in the standard model, and thus the processing proceeds to step S905.

In step S903, the first standard model update unit 305 refers to the state number in the minimum difference value information, and sets the active flag to ON. Then, in step S904, the first standard model update unit 305 increments the number of appearances.

The number of appearances is associated with the position in the frame image and temporarily stored in the RAM 203 as active state information. An example of this active state information is illustrated in FIG. 10.

On the other hand, in step S905, the first standard model update unit 305 adds a feature quantity for the frame image to the standard model as a new state. Next, in step S906, the first standard model update unit 305 adds the current time as the time when this state was generated in the standard model. In the present exemplary embodiment, although the current frame number is used as the current time, obviously, an ordinary time expressed in hours, minutes, and seconds may also be used.

In step S907, since this is a new appearance state, the number of appearances is "1". Similar to step S904, the number of appearances is associated with the position in the frame image and temporarily stored in the RAM 203 as active state information. Then, in step S908, the first standard model update unit 305 sets the active flag to ON.

Next, in step S909, the first standard model update unit 305 determines whether all pixels (positions) in the frame image have been processed. If it is determined that not all pixels have been processed (NO in step S909), in step S910, the processing proceeds to the next pixel, and the processing of steps S901 to S909 is repeated.

On the other hand, if it is determined that all pixels have been processed (YES in step S909), the processing is finished. As described above, at the start time of the image processing, since the difference value is set to the maximum value, all of the states are determined as being new, and are all added to the standard model.

Figure 11:
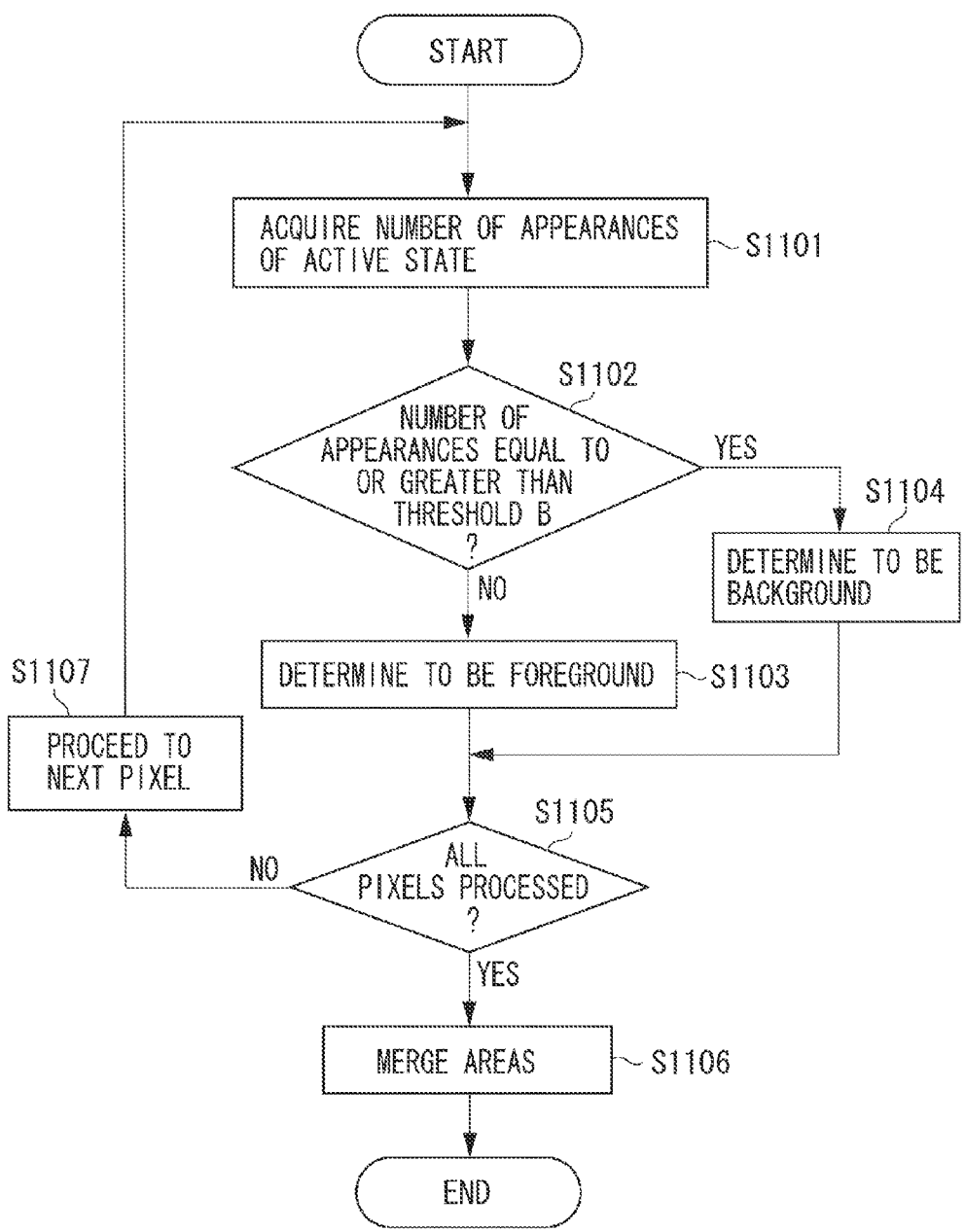
FIG. 11 is a flowchart illustrating an example of the detailed procedures performed in foreground/background determination processing.

FIG. 11 is a flowchart illustrating an example of the detailed procedures performed in the foreground/background determination processing performed in step S404 in FIG. 4.

First, in step S1101, the foreground/background determination unit 306 acquires the active state, which is the result of the first update processing performed in step S403, from the active state information in the RAM 203 starting from the upper left pixel in the frame image. Subsequently, this processing is performed on each individual pixel while proceeding from left to right down along each line.

Next, in step S1102, the foreground/background determination unit 306 determines whether the number of appearances of the active state for the target pixel is more than a predetermined threshold. If it is determined that this number of appearances is less than the predetermined threshold (NO in step S1102), in step S1103, the foreground/background determination unit 306 determines that the target pixel is a foreground. Thus, in step S1103, the foreground/background determination unit 306 sets the foreground flag indicating a foreground to ON, and adds this information to the active state information.

If it is determined that the number of appearances is equal to or greater than the predetermined threshold (YES in step S1102), in step S1104, the foreground/background determination unit 306 determines that the target pixel is a background. Thus, in step S1104, the foreground/background determination unit 306 sets the foreground flag to OFF, and adds this information to the active state information. FIG. 12 illustrates an example of active state information to which a foreground flag has been added.

Next, in step S1105, the foreground/background determination unit 306 determines whether all pixels (positions) in the frame image have been processed. If it is determined that not all pixels have been processed (NO in step S1105), in step S1107, the processing proceeds to the next pixel. Then, the processing of steps S1101 to S1105 is repeated.

On the other hand, if it is determined that all pixels have been processed (YES in step S1105), since the determination regarding whether each pixel is in the foreground or the background has been finished, the processing proceeds to the next step S1106.

Next, in step S1106, the foreground/background determination unit 306 refers to the active state information in the RAM 203 and merges adjacent pixels that have been both determined to be in the foreground into a single area. Further, the foreground/background determination unit 306 takes a circumscribed rectangle for each area, and generates foreground area information. The foreground area information consists of the number of foreground areas, and the coordinates (x1, y1) of the upper left corner and the coordinates (x2, y2) of the lower right corner of the circumscribed rectangle of each foreground area. FIG. 13 illustrates an example of foreground area information.

FIG. 14 is a flowchart illustrating an example of the detailed procedures performed in the processing for detecting subjects from the foreground areas performed in step S405 of FIG. 4.

First, in step S1401, the subject detection unit 307 acquires a frame image from the video input unit 301. Next, in step S1402, the subject detection unit 307 acquires the coordinates of the circumscribed rectangle of one foreground area from the foreground area information, which is the result of the foreground/background area determination processing performed in step S404.

In step S1403, the subject detection unit 307 performs subject detection by scanning a detection window for only the foreground areas. Then, the subject detection unit 307 generates corner coordinates which define the circumscribed rectangle of the subjects as subject area information that represents the areas of the detected subjects.

Next, in step S1404, the subject detection unit 307 determines whether foreground areas indicated in the foreground area information have been processed. If it is determined that not all foreground areas have been processed (NO in step S1404), in step S1405, the processing proceeds to the next foreground area, and the processing of steps S1402 and S1404 is repeated.

FIG. 15 is a flowchart illustrating an example of the detailed procedures performed in the second and third update processing of the standard model in step S407 of FIG. 4. In the present exemplary embodiment, the second and third update processing of the standard model are performed on each image consecutively.

First, in step S1501, the second standard model update unit 308 acquires the subject area information in the RAM 203 that is obtained as the result of the processing performed in step S405 for detecting subjects from the foreground areas.

Next, in step S1502, the second standard model update unit 308 determines whether the target pixel is in the subject area by referring to the subject area information starting from the pixel at the upper left of the frame image, then proceeding from left to right moving down along each line. If it is determined that the target pixel is not in the subject area (NO in step S1502), the processing skips the step S1503 to be described below, and proceeds to step S1504.

On the other hand, if it is determined that the target pixel is in the subject area (YES in step S1502), in step S1503, the second standard model update unit 308 refers to the standard model for the target pixel and increments the number of appearances of the inactive states in the standard model. This is performed because this state can be considered as having appeared based on the assumption that the state corresponding to a background is merely hidden by a subject's body.

If there is a plurality of inactive states for the target pixel, the most frequently appearing state, specifically, the state appearing the longest, is selected as the state corresponding to the background, and its number of appearances is incremented. The processing performed until this point is the second update processing of the standard model.

Next, in step S1504, the third standard model update unit 309 calculates a deletion estimated time for the inactive states based on the value of the number of appearances using the equation (1).

$$\text{Deletion estimated time} = \text{generation time of state} + \alpha \times \text{number of appearances} \quad (1)$$

In this equation, $\alpha$ is a predetermined coefficient. The reason for determining the deletion estimated time of the states based on the number of appearances is that the states that appear a fewer number of times are considered as being temporary. Therefore, the method for calculating the deletion estimated time is not limited to equation (1), as long as this intention is reflected.

Next, in step S1505, the third standard model update unit 309 determines whether the current time has already reached the deletion estimated time. If it is determined that the current time has already reached the deletion estimated time (YES in step S1505), in step S1506, the third standard model update unit 309 deletes the corresponding state from the standard model. On the other hand, if it determined that the current time has not already reached the deletion estimated time (NO in step S1505), the processing skips step S1506. The processing performed until this point is the third update processing of the standard model.

In step S1507, the second standard model update unit 308 determines whether all of the inactive states at the target position have been processed. This determination is based on whether, among the states up to the address written in the pointer for the next target position in the standard model management information, whether there are any active flags that are OFF. If it is determined that not all inactive states have been processed (NO in step S1507), in step S1508, the second standard model update unit 308 reads the next state whose active flag is OFF. Then, the processing from steps S1504 to S1507 is repeated.

On the other hand, if it is determined that all inactive states have been processed (YES in step S1507), in step S1509, the second standard model update unit 308 determines whether the second standard model update processing performed in steps S1502 to S1506 has been performed for all pixels in the frame image.

If it is determined that not all pixels have been processed (NO in step S1509), in step S1510, the processing proceeds to the next pixel, and the processing of steps S1502 to S1508 is repeated. On the other hand, if it is determined that all pixels have been processed (YES in step S1509), the processing is finished.

In step S1503, although a background state hidden by a person's body was deemed as appearing based on incrementing the number of appearances, it can clearly be seen from the equation (1) that the same effect can be obtained by delaying the generation time.

Further, a deletion prohibition flag may be provided. In this case, in step S1503, the deletion prohibition flag, which prohibits deletion of that state, is set to ON. Consequently, a step of branching based on a deletion prohibition flag determination is added before step S1506 so that the deletion processing of step S1506 is not executed when the deletion prohibition flag is ON.

Further, if it is determined based on the determination performed in step S1502 that the target pixel is not in the subject area (NO in step S1502), if the deletion prohibition flag is ON, it is set to OFF. This is done in order to perform a deletion determination in the same manner as for a normal state, because the background is no longer hidden by a person's body.

Further, based on the second update processing of the standard model, the number of appearances in the standard model is appropriately maintained. Consequently, based on the third update processing of the standard model, the deletion of the standard model states is also appropriately performed. More specifically, the accuracy of the standard model can be prevented from deteriorating due to deletion of the standard model states corresponding to only the background hidden by a person's body.

Thus, according to the present exemplary embodiment, the accuracy of the background difference standard model can be maintained and false detections are less likely to occur even during an action in which a subject, such as a person, repeatedly stops and starts moving. Therefore, since the search range for subject detection does not need to spread as far as meaningless areas, a subject can be stably and rapidly detected.

Figure 3:
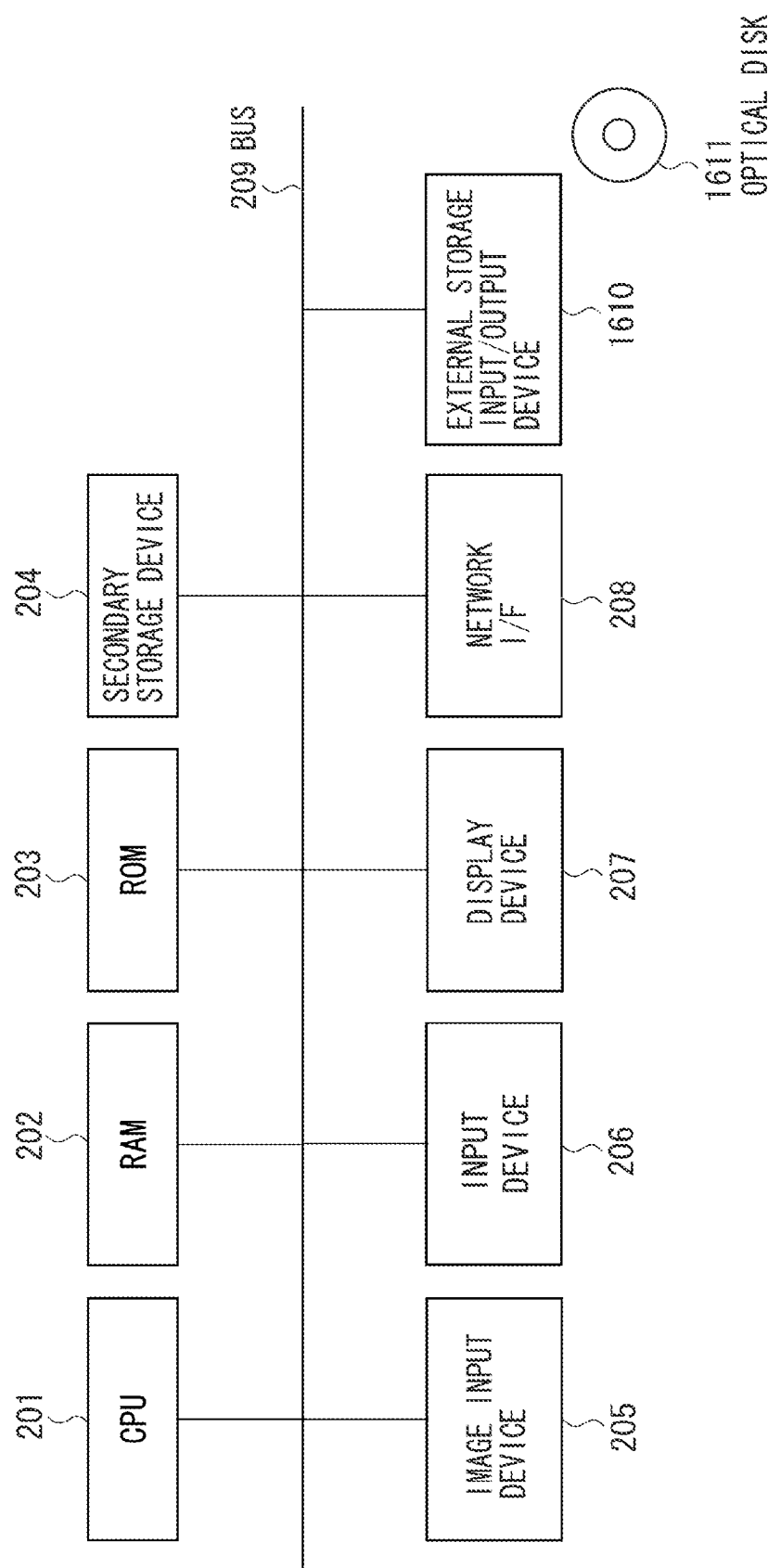
FIG. 3 is a block diagram illustrating another example of a hardware configuration of an image processing apparatus.

FIG. 3 is a block diagram illustrating a hardware configuration example of an image processing apparatus according to a second exemplary embodiment, and elements and parts which are identical with those in the first exemplary embodiments are designated by identical reference numerals.

The present exemplary embodiment differs from the first exemplary embodiment in adding an optical disk 1611, such as a digital versatile disk (DVD) or a compact disk (CD), on which a program is recorded, and an external storage input/output device 1610. In this configuration, when the optical disk 1611 on which a program is recorded is inserted into the external storage input/output device 1610, the CPU 201 reads the program from the storage medium to expand the program in RAM 203. Then, the RAM 203 starts the program, so that the same processing as that according to the first exemplary embodiment can be realized.

Further, in FIG. 2, although each unit is connected by the bus 209, some of the units may be connected by the network I/F 208. For example, images can be input by connecting the image input device 205 via the network I/F 208.

In addition, all of the units from the feature quantity extraction unit 302 to the third standard model update unit 309 may be integrated in an integrated circuit chip, and integrated with the image input device 205. Moreover, the subject area information illustrated in FIG. 5 may be received by a personal computer (PC) via a LAN cable.

Alternatively, in another configuration, all of the units up to the foreground/background determination unit 306, the second standard model update unit 308, and the third standard model update unit 309 are integrated in an integrated circuit chip and integrated with the image input device 205, and the subject detection unit 307 is configured in a PC. Further, the frame image, the foreground area information illustrated in FIG. 13, and the subject area information illustrated in FIG. 5 may be exchanged via a LAN cable.

In addition, in the first exemplary embodiment, although the subject detection unit 307 is used to detect a person, obviously the present invention is not limited to this. For example, a specific subject may be detected, such as a vehicle or an animal.

Further, the present invention can also be realized by supplying software (a program) for realizing the functions of the above exemplary embodiments to a system or an apparatus via a network or via various storage media, and having a computer (or a CPU or a micro processing unit (MPU)) of the system or apparatus read and execute the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-189741 filed Aug. 26, 2010, which is hereby incorporated by reference herein in its entirety.

What is claimed is:

1. An image processing apparatus comprising:
a calculation unit configured to calculate a difference between a feature quantity of input video data and a feature quantity of a model representing a background;
a determination unit configured to determine whether a partial area in the input video data is a foreground or a background based on the difference;
a detection unit configured to detect a subject area from an area determined to be a foreground;
a first update unit configured to update appearance information that represents an appearance state of a background relating to the subject area; and
a second update unit configured to update the model based on the appearance information.

2. The image processing apparatus according to claim 1, wherein the second update unit is configured to delete from the model of an area that has few appearances as a background based on the appearance information.

3. The image processing apparatus according to claim 2, wherein the first update unit is configured to update a number of appearances as the appearance information.

4. The image processing apparatus according to claim 3, wherein the second update unit is configured to delete from the model of each area after a time determined based on the number of appearances has elapsed.

5. The image processing apparatus according to claim 1, wherein the model stores a plurality of states for each position.

6. The image processing apparatus according to claim 5, wherein the calculation unit is configured to calculate a difference with a state having a lowest difference with the video data from among the plurality of states for each position.

7. The image processing apparatus according to claim 6, further comprising a third update unit configured to, when the difference is smaller than a threshold, update the appearance information of the state corresponding to that difference.

8. The image processing apparatus according to claim 1, wherein the partial area has a larger size than a subject.

9. An image processing method comprising:
calculating a difference between a feature quantity of input video data and a feature quantity of a model representing a background;
determining whether a partial area in the input video data is a foreground or a background based on the difference;
detecting a subject area from an area determined to be a foreground;
updating appearance information that represents an appearance state for a background relating to the subject area; and
updating the model based on the appearance information.

10. A non-transitory storage medium storing a program for causing a computer to execute the image processing method according to claim 9.

* * * * *